US007947212B2

(12) United States Patent
Hilton Steele et al.

(10) Patent No.: US 7,947,212 B2
(45) Date of Patent: May 24, 2011

(54) DENSIFICATION OF CERIA BASED ELECTROLYTES

(75) Inventors: Brian Charles Hilton Steele, East Horsley (GB); Norah Ruth Steele, legal representative, East Horsley (GB); Gene Lewis, London (GB); Naoki Oishi, Ottawa (CA); Ahmet Selcuk, West Sussex (GB)

(73) Assignee: Ceres Intellectual Property Company Limited, Crawley (GB)

( * ) Notice: Subject to any disclaimer, the term of this patent is extended or adjusted under 35 U.S.C. 154(b) by 1216 days.

(21) Appl. No.: 10/552,476

(22) PCT Filed: Mar. 25, 2004

(86) PCT No.: PCT/GB2004/001293
§ 371 (c)(1),
(2), (4) Date: Aug. 31, 2006

(87) PCT Pub. No.: WO2004/089848
PCT Pub. Date: Oct. 21, 2004

(65) Prior Publication Data
US 2007/0020498 A1     Jan. 25, 2007

(30) Foreign Application Priority Data

Apr. 9, 2003 (GB) .................................. 0308215.3

(51) Int. Cl.
*C04B 33/32* (2006.01)
*C04B 35/50* (2006.01)
(52) U.S. Cl. ........................................ 264/618; 501/152

(58) Field of Classification Search .................. 264/603, 264/613, 618; 252/518.1, 521.1; 501/153, 501/152
See application file for complete search history.

(56) References Cited

U.S. PATENT DOCUMENTS

| 5,509,189 A * | 4/1996 | Tuller et al. ................. 29/623.1 |
| 5,665,482 A * | 9/1997 | Mori et al. ................... 252/62.2 |
| 2003/0027027 A1 * | 2/2003 | Cutler et al. ..................... 429/33 |
| 2004/0026668 A1 * | 2/2004 | Kuroda et al. ................ 252/500 |
| 2005/0048340 A1 * | 3/2005 | Bagger et al. ................... 429/30 |

FOREIGN PATENT DOCUMENTS

| EP | 1 000 913 A1 | 2/2001 |
| EP | 1 254 862 A2 | 11/2002 |
| GB | 205291 | 10/1923 |
| GB | 2368450 | 5/2002 |
| WO | 03/075382 A2 | 9/2003 |

OTHER PUBLICATIONS

Oishi et al; "Stainless Steel Supported Thick Film IT-SOFCs for Operation at 500-600 degree C"; Journal of the Electrochemical Society Proceedings; vol. 2002-21, 2002, pp. 230-237; XP009032114.

* cited by examiner

*Primary Examiner* — Matthew J Daniels
*Assistant Examiner* — Erin Snelting
(74) *Attorney, Agent, or Firm* — Lowe Hauptman Ham & Berner LLP

(57) ABSTRACT

The fabrication of ceria based electrolytes to densities greater than 97% of the theoretical achievable density at temperatures below 1200° C., preferably approximately 1000° C., is disclosed. The electrolyte has a concentration of divalent cations minus an adjusted concentration of trivalent cations of between 0.01 mole % and 0.1 mole %.

15 Claims, 2 Drawing Sheets

DENSIFICATION OF CERIA BASED ELECTROLYTES

The present invention relates to the densification of ceria based electrolytes as may be used in fuel cells and oxygen generators for example.

Procedures are known for fabricating thick film solid oxide fuel cell (SOFC) structures onto porous ferritic stainless steel foil substrates. The metal supported single cells can then easily be assembled into arrays by laser welding the individual cells onto a metal bi-polar plate. Such technology is described in GB 2,368,450. It has also been demonstrated that ceria based electrolytes, eg $Ce_{0.9}Gd_{0.1}O_{1.95}$ (CG10) could be sintered on a metallic substrate to provide a dense impermeable electrolyte film at lower temperatures than previously used. The ability to sinter electrolytes at lower temperatures, eg 1000° C. minimises degradative changes to the stainless steel microstructure, reduces fabrication costs and also reduces the concentration of transition metal cations in the electrolyte due to transport of gaseous metal species from the substrate and its protective oxide.

EP-A-1000913 describes processes for producing dense (>97% of the theoretically achievable density) ceria electrolytes at relatively low temperatures (~1000° C.). This patent application demonstrates that when small amounts (1-2 mol %) of CuO, NiO or CoO are added to commercial ceria based electrolyte powders (eg supplied by Rhodia, France) then pellets pressed from these doped pellets can be sintered to densities greater than 97% of the theoretical achievable density at temperatures as low as 1000° C. compared to 1350° C. usually required for pellets without any transition metal cation additions. It should be noted that at densities of 97% of the theoretical achievable density the ceria based electrolytes are impermeable and so significantly reduce gaseous leakage between the anode and cathode gases.

However the addition of transition metal cations is not without problems. EMF measurements have been carried out at 650° C. on thin (~1 mm) discs fabricated from the sintered powders. EMF values (910 mV) for electrolyte discs without additions of divalent cations were at least 100 mV higher than values recorded (800 mV) for thin discs containing 2 mole % $Co^{2+}$ or 1 mole % $Mn^{2+}$ using similar experimental conditions, Clearly additions of the transition metal cations has introduced significant electronic conductivity which is an undesirable side-effect as it would have a major impact on the performance characteristics of intermediate-temperature solid oxide fuel cell (IT-SOFC) stacks incorporating ceria based electrolytes with cation additives.

It is an object of the present invention to assist in overcoming one or more of the problems described above to enable the sintering of dense electrolytes without an excessive reduction in EMF.

According to a first aspect of the present invention there is provided a method of determining the effective concentration of divalent cations in a fabricated electrolyte, the method comprising determining the concentration of divalent cations in a fabricated electrolyte;

determining the concentration of trivalent cations in a fabricated electrolyte and subtracting the adjusted concentration of trivalent cations from the concentration of divalent cations to produce the effective concentration of divalent cations. Due to the deleterious effect of the trivalent cations it is necessary to multiply their measured concentration by a factor between 5 and 10 as described later.

This method enables the effective concentration of divalent actions in an electrolyte to be determined. Once the effective concentration of divalent actions can be determined, it may be optimised to ensure sufficient densification of the electrolyte under desired conditions, eg approximately 1000° C. It should be emphasised that the procedures described herein apply to deposited 'green' electrolyte layers having typical densities in the range 50-60%. Fabrication routes capable of attaining this requirement have been described in patent application GB 0205291, and a preferred method involves depositing the electrolyte powder by EPD followed by isostatic pressing.

Both divalent and trivalent cations can be incorporated into an electrolyte film during the fabrication procedures, but it has been found that their roles are very different. Divalent cations can enhance the densification process whereas it has been found that the presence of trivalent cations have an adverse effect on the densification process. To ensure electrolyte densification at 1000° C. it has been found that the concentration of divalent cations should exceed the concentration of trivalent cations, and it can be necessary to deliberately add small quantities of divalent cations (eg $Mn^{2+}$, $Fe^{2+}$, $Mg^{2+}$, etc) to overcome the deleterious effects of trivalent cations (eg $Cr^{3+}$, $Fe^{3+}$, $Al^{3+}$, etc) in the electrolyte.

The concentration of divalent cations in a fabricated electrolyte may be determined by adding the concentration of divalent cations that were added to the electrolyte prior to completion of the fabrication process to the concentration of divalent cations determined to be in the electrolyte after the fabrication process, had there been no additions.

Divalent cations present in the electrolyte after the fabrication process could have originated from a number of sources. Divalent cations can originate from the conversion or reduction of intrinsic trivalent cations into divalent cations. For example the processing conditions during the fabrication procedure can be modified to reduce the concentration of deleterious trivalent cations, for example $Fe^{3+}$ can be reduced to $Fe^{2+}$ by appropriate control of the oxygen or water partial pressure in a sintering furnace. Divalent cations in the electrolyte could have originated from vapours from a metal substrate and/or an oxide layer on a metal substrate. Divalent cations can be added to the electrolyte at an appropriate opportunity, eg prior to the sintering process. The magnitude and type of the various cation impurity levels in turn influence the sintering kinetics and determine whether adequate densification of the electrolyte (generally required to be greater than 97% of the achievable density for desirable results) can be achieved by 1000° C.

The inventors of the present invention have surprisingly found that an effective concentration of divalent cations (concentration of divalent cations—adjusted concentration of trivalent cations) of between 0.01 mole % and 0.1 mole % inclusive can be used to produce an electrolyte with a density greater than 97% of the achievable density at approximately 1000° C. Furthermore such an effective concentration of divalent cations does not produce as severe a reduction in EMF as electrolytes containing greater concentrations of divalent cations.

Preferably the effective concentration of divalent cations is between 0.02 mole % and 0.09 mole % inclusive.

More preferably the effective concentration of divalent cations is between 0.03 mole % and 0.08 mole % inclusive.

According to a second aspect of the present invention there is provided a method of preparing an electrolyte with a desired effective cation concentration, the method comprising fabricating an electrolyte and before or during fabrication increasing the divalent cation concentration by one or more of the following:

receiving divalent cations from vapour produced by a metal substrate associated with the electrolyte or an oxide layer on the substrate;

reducing trivalent cations in the substrate material into divalent cations; or specifically adding divalent cations to the electrolyte prior to or during fabrication;

such that the effective concentration of divalent cations minus the adjusted concentration of trivalent cations in the fabricated electrolyte is within a desired range.

The desired range may include or be between 0.01% and 0.1 mole %, but is preferably between 0.02 mole % and 0.09 mole % inclusive and more preferably between 0.03 mole % and 0.08 mole % inclusive.

According to a third aspect of the present invention there is provided an electrolyte with an effective concentration of divalent cations determined by subtracting an adjusted concentration of trivalent cations in the electrolyte from the concentration of divalent cations in the substrate. The effective cation concentration may be between 0.01 mole % and 0.1 mole % inclusive, but is preferably between 0.02 mole % and 0.09 mole % inclusive and is more preferably between 0.03 mole % and 0.08 mole % inclusive.

According to a fourth aspect of the present invention there is provided a half cell comprising a substrate, an electrode and an electrolyte according to the third aspect of the present invention.

According to a fifth aspect of the present invention there is provided a fuel cell comprising the half cell of the fourth aspect of the present invention provided with a further electrode on the opposite side of the electrolyte from the other electrode.

According to an sixth aspect of the present invention there is provided an oxygen generator comprising the half cell of the fourth aspect with a further electrode on the opposite side of the electrolyte from the other electrode.

Preferred embodiments of the present invention will now be described herein below by way of example only with reference to the accompanying drawings, in which.

Experiments have been carried out using a titanium-niobium stabilised ferritic stainless steel substrate (~18% Cr) with the designation 1.4509. Analysis of a sintered electrolyte on the substrate indicated cation impurity levels of $Fe^{2+}$ (0.25 mole %) and $Cr^{3+}$ (0.005 mole %). Subsequent investigations have shown that densification of the CGO10 electrolyte can be accomplished using a variety of ferritic stainless steels with different initial compositions and oxidation characteristics. These different substrates together with processing variations can produce significant changes in the concentration and valence of the metal impurities incorporated into the CGO electrolyte.

Figure 1:
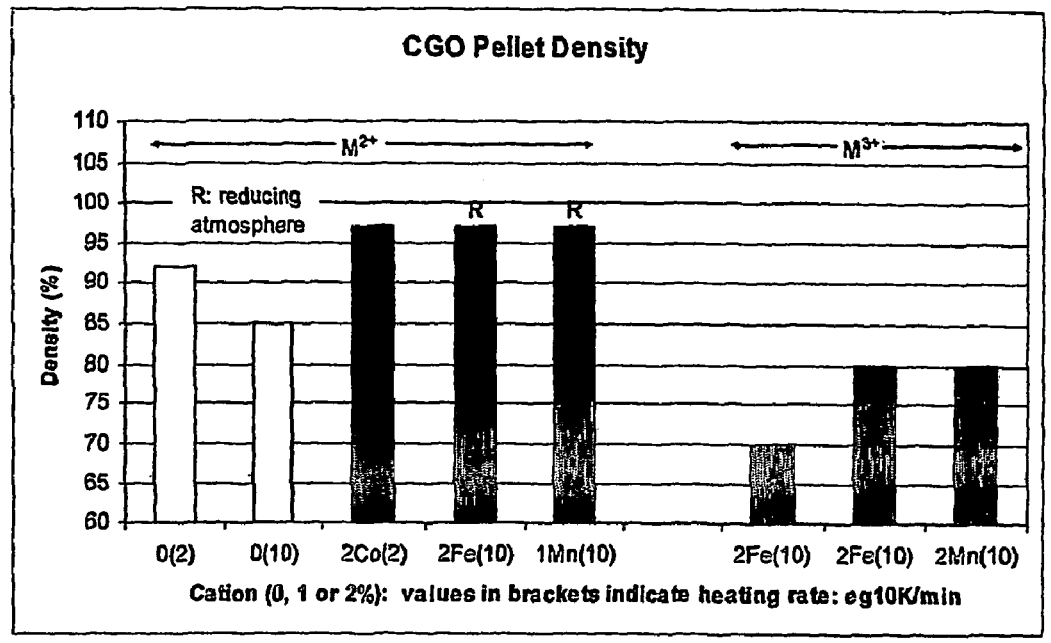
FIG. 1 illustrates the sintering characteristics of ceria based electrolyte pellets for 0, 1% and 2% addition of cations.
Figure 2:
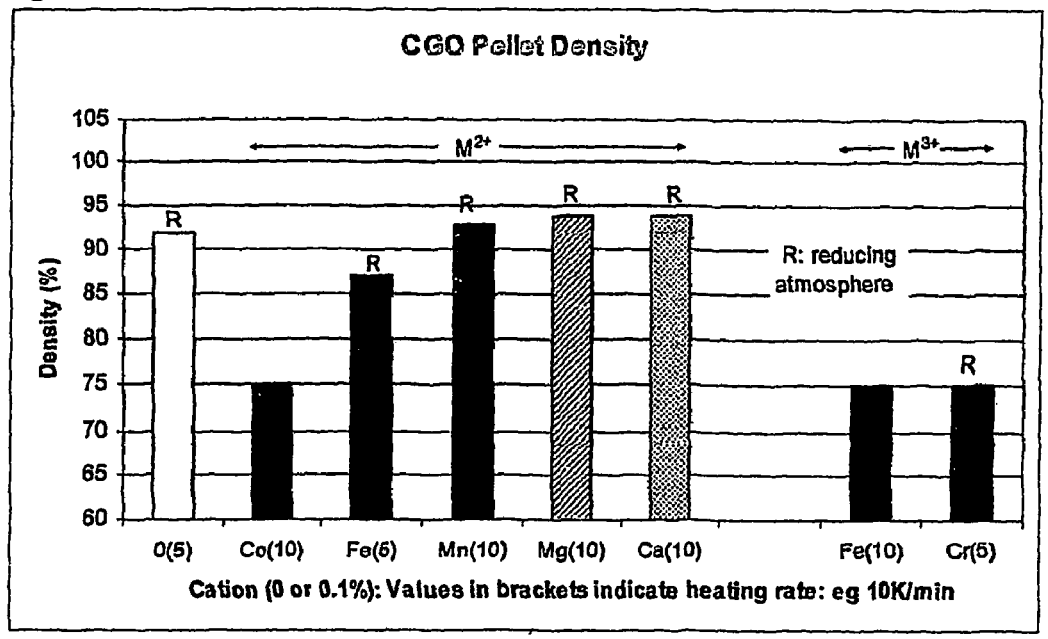
FIG. 2 illustrates the sintering characteristics of ceria based electrolyte pellets for 0 and 0.1% addition of cations

Studies on the sintering characteristics of a ceria based electrolyte, $Ce_{0.9}Gd_{0.1}O_{1.95}$, powder are summarised in FIG. 1. Inspection of FIG. 1 reveals that 1-2 mole % cation additions of divalent cations (eg $Co^{2+}$, $Fe^{2+}$, $Mn^{2+}$) can produce technologically useful pellet densities around 97/98% of the theoretical achievable density, whereas the trivalent cations ($Fe^{3+}$, $Mn^{3+}$) severely retard the sintering kinetics. FIG. 2 shows that for cation additions at the 0.1% levels the density of fired pellets was about the same for each of the additions of $Mn^{2+}$, $Mg^{2+}$, $Ca^{2+}$, and comparable to densities (~93% of the theoretical achievable density) developed by the pellets without cation additions as mentioned earlier. $Co^{2+}$ and $Fe^{2+}$ reduced the sintering kinetics, and particularly noteworthy is the very large decrease in sintered density due to additions of $Fe^{3+}$ and $Cr^{3+}$, even for cation additions as low as 0.1%.

The studies summarised in FIGS. 1 and 2 show that the addition of divalent cations enhances the densification process, whereas the presence of trivalent cations has an adverse effect on the densification process. However, these studies indicate that ceria based pellets require a divalent cation concentration of the order of 2% to produce densification of 97% of the theoretical achievable density. The studies summarised in FIGS. 1 and 2 highlight how surprising it is that dense electrolyte thick films can be produced with apparently lower divalent cation concentrations.

Figure 3:
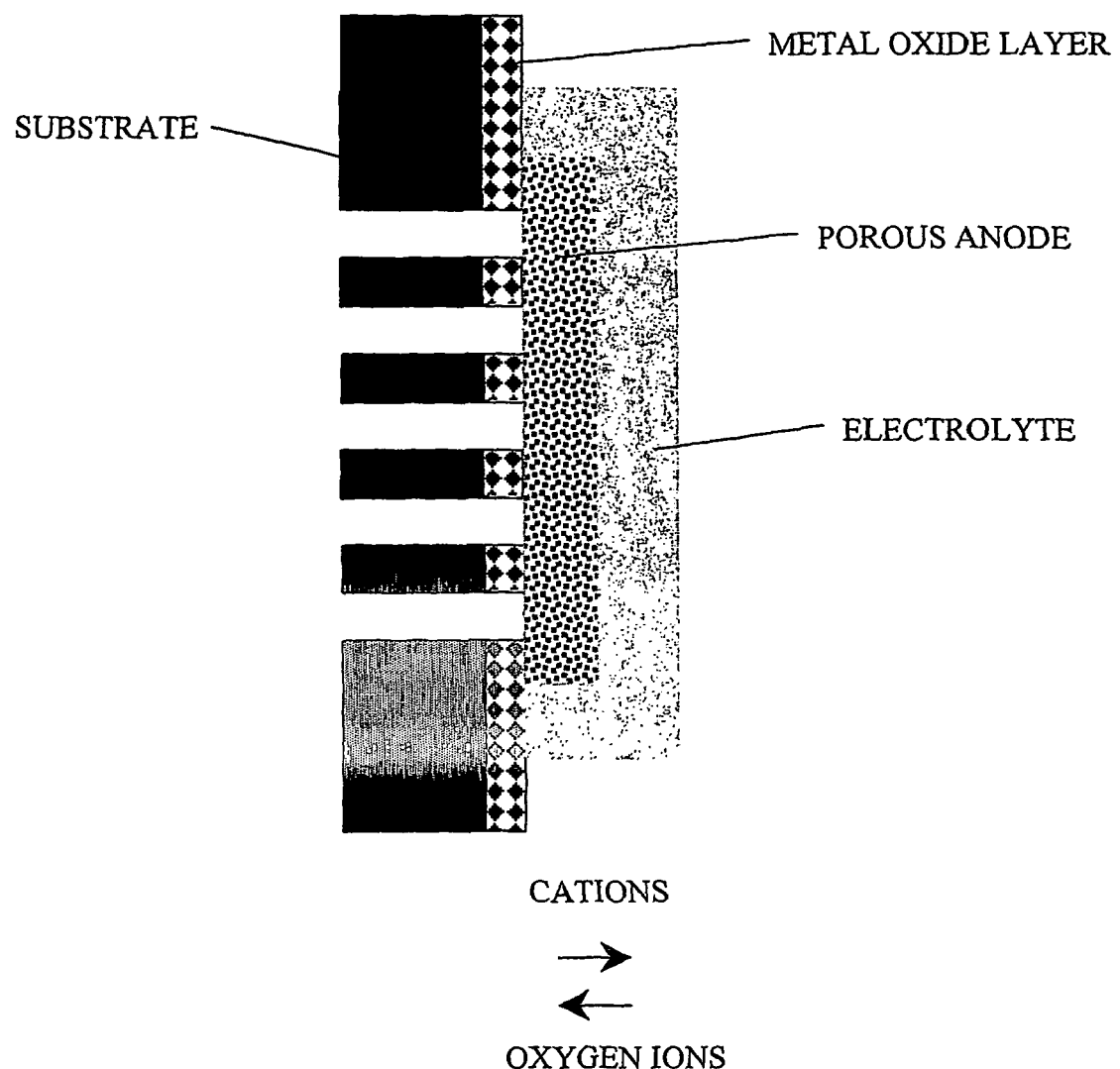
FIG. 3 is a schematic representation of a metal foil supported thick film cell assembly.

The observed densification of the electrolyte thick films compared to pellets could be associated with the realisation that the sintering process is taking place within an oxygen partial pressure gradient. The associated oxygen flux contributes to oxidation of the metal substrate foil. At the same time a small but significant cation flux in the opposite direction influences the sintering kinetics which are controlled by cation transport as illustrated in FIG. 3. Both anionic and cation fluxes can be produced when multi-component oxide phases are placed in oxygen chemical potential gradients, and the associated differential transport processes can be responsible for de-mixing phenomena. Whatever the details of the enhanced sintering mechanism its manifestation is an important technological innovation, and investigations by the applicants have provided information related to optimisation of the processing parameters to densify ceria electrolytes which may be used in SOFC structures supported on metal substrates, oxygen generators etc.

In some embodiments, provided is a method of preparing a ceria based electrolyte with a density greater than 97% of the theoretical achievable density, the method comprising; providing a ceria based electrolyte and sintering the electrolyte at 1200° C. or less such that the concentration of divalent cations minus the adjusted concentration of trivalent cations in the sintered electrolyte is between 0.01 mole % and 0.1 mole %. In some embodiments, the conditions of the sintering process are controlled to reduce at least some trivalent cations in the electrolyte into divalent cations. In some embodiments, the conditions of the sintering process are controlled to produce a suitable oxygen or water pressure to reduce a suitable amount of trivalent cations into divalent cations.

In some embodiments, the electrolyte is provided on a substrate and the substrate material is selected to produce the required concentration of divalent cations minus the adjusted concentration of trivalent cations in the electrolyte. In some embodiments, an electrode is provided between the electrolyte and the substrate.

In some embodiments, divalent cations are added to the electrolyte before or during the sintering process.

In some embodiments, the concentration of divalent cations minus the adjusted concentration of trivalent cations in the sintered electrolyte is between 0.02 mole % and 0.09 mole % inclusive. In some embodiments, the concentration of divalent cations minus the adjusted concentration of trivalent cations in the sintered electrolyte is between 0.03 mole % and 0.08 mole % inclusive.

In some embodiments, the concentration of trivalent cations is adjusted by multiplication by a number between 5 and 10.

In some embodiments, the electrolyte is sintered at 1100° C. or less. In some embodiments, the electrolyte is sintered at 1050° C. or less. In some embodiments, the electrolyte is sintered at 1000° C. or less.

In some embodiments, the electrolyte is provided as a thick film.

The following empirical equation has been developed to ensure high (>98% of the theoretical achievable density) electrolyte densities, and to optimise the processing conditions for a variety of metal substrates, anode compositions, and SOFC configurations.

$$[M_E^{2+}] = [M_A^{2+}] + [M_I^{2+}] - Y[M_I^{3+}] \quad (A)$$

$[M_E^{2+}]$ represents the effective concentration of divalent cations (eg $Mn^{2+}$, $Fe^{2+}$, $Mg^{2+}$, etc) in a specific electrolyte. Experiments suggest that minimum effective concentrations of divalent cations required to ensure densification (>98% of the theoretical achievable density) are typically 0.01-0.1 mole % (200-1000 ppm), which are below values mentioned in earlier publications such as EP-A-1000913. It should be noted that the valence of selected cation impurities, e.g. Fe, Mn, will depend upon the oxygen partial pressure established within the sintering furnace.

$[M_A^{2+}]$ represents the concentration of divalent cations (eg, $Mn^{2+}$, $Fe^{2+}$, $Mg^{2+}$, etc) that were added to electrolyte prior to the high temperature fabrication procedures.

$[M_I^{2+}]$ represents the concentration of divalent cations (eg $Mn^{2+}$, $Fe^{2+}$, etc) determined to be in the electrolyte after the fabrication processes (without prior additions). The concentration of impurities can be determined by dynamic SIMS or Glow Discharge Optical Emission Spectrography (GDOES). Divalent cations are beneficial for enhanced sintering at 1000° C.

NOTE: ideally $|M_I^{2+}|$ should not exceed 0.1% for $Fe^{2+}$ and $Mn^{2+}$ ions, to avoid significant electronic conductivity in the electrolyte The divalent cations in the electrolyte after the fabrication process could have originated from vapours from the metal substrate, or oxide on the substrate or from reduction of trivalent cations in the electrolyte layer for example.

$[M_I^{3+}]$ represents the concentration of trivalent cations (eg $Fe^{3+}$, $Cr^{3+}$, $Al^{3+}$, etc) determined to be in the electrolyte after the fabrication processes. The concentration of impurities is determined as above for the determination of the concentration of divalent cations in the electrolyte after the fabrication processes without prior additions. Trivalent cations are deleterious for sintering enhancement at 1000° C.

Y represents a multiplying factor (typically 5-10). The presence of trivalent cations is very deleterious for the sintering process and so their actual concentration has to be multiplied by the factor Y to take account of their severe impact on the sintering behaviour. It can also be necessary to vary the value of Y according to the nature and distribution of the trivalent cations. For example, the influence of $Al^{3+}$ in discrete $Al_2O_3$ particles introduced during milling processes, differs from the role of $Al^{3+}$ interfacial species widely distributed over the surface of the CGO powder.

EXAMPLES

FIG. 3 shows a schematic representation of a metal foil supported thick film cell assembly as used in some of the following examples.

1. CGO is deposited directly onto 1.4509 metal substrate (no pre-oxidation Treatment). The CGO is sintered at 1000° C. in a $H_2/H_2O$/argon atmosphere designed to establish a $pO_2$ value of $10^{-14}$ at 1000° C. $[M_E^{2+}]$ was determined to be +0.1% (Table 1) and dense electrolyte was produced. The Fe and Cr are transported into the electrolyte via the vapour phase species, eg: Fe(g), Fe(OH)$_2$ (g), Cr(g), Cr(OH)$_3$ (g). Note the concentration of gaseous metal hydroxide species will be influenced by metal thermodynamic activity in the metal oxide coating, and the p ($H_2O$) in sintering furnace (processing variable).

2. A CGO electrolyte film is deposited directly onto 1.4509 metal substrate (pre-oxidation treatment) and sintered at 1000° C. in $CO_2/H_2$ argon atmosphere designed to establish $pO_2$ value of $10^{-14}$ at 1000° C. $[M_E^{2+}]$ was found to be −0.07% (Table 1) due to $Al^{3+}$ contamination. The electrolyte was not dense.

3. A Ni-CGO anode is fabricated on top of a 1.4509 metal substrate (pre-oxidation treatment). A CGO film is next deposited on top of the anode (see FIG. 3), and sintered at 1000° C. in a $CO_2/H_2$/argon atmosphere designed to establish $pO_2$ value of $10^{-14}$ at 1000° C. $[M_E^{2+}]$ was found to be −0.05% (Table 1) due to $Al^{3+}$ contamination. The electrolyte was not dense.

4. A Ni-CGO anode is fabricated on top of a JS-3 metal substrate (pre-oxidation treatment). A CGO film is next deposited on top of the anode (see FIG. 3), and sintered at 1000° C. in a $H_2/H_2O$/argon atmosphere designed to establish $pO_2$ value of $10^{-14}$ at 1000° C. $[M_E^{2+}]$ was found to be +0.1% (Table 1) due to high $Mn^{3+}$ content in spite of $Al^{3+}$ contamination.

A dense electrolyte was produced.

5. A Ni-CGO anode is fabricated on top of a JS-3 metal substrate (pre-oxidation treatment). Mn (0.1 cation %) was added to the CGO powder. A CGO film is next deposited on top of the anode (see FIG. 3), and sintered at 1000° C. in a $H_2/H_2O$/argon atmosphere designed to establish $pO_2$ value of $10^{-14}$ at 1000° C. $[M_E^{2+}]$ was found to be +0.1% (Table 1) due to high $Mn^{3+}$ content in spite of $Al^{3+}$ contamination and Fe present as $Fe^{3+}$.

A dense electrolyte was produced.

6. A Ni-CGO anode is fabricated on top of a ZMG 232 metal substrate (pre-oxidation treatment). A CGO film is next deposited on top of the anode (see FIG. 3), and sintered at 1000° C. in a $H_2/H_2O$/argon atmosphere designed to establish $pO_2$ value of $10^{-14}$ at 1000° C. $[M_E^{2+}]$ was found to be +0.08% (Table 1) due to high $Mn^{3+}$ content in spite of $Al^{3+}$ contamination.

A dense electrolyte was produced.

TABLE 1

| Ferritic Stainless Steel Substrate | Oxide | Anode | $[M_A^{2+}]$ % | $[M_I^{2+}]$ % | $Y[M_I^{3+}]$ % | $[M_E^{2+}]$ % | Result |
|---|---|---|---|---|---|---|---|
| 1.4509 | NT | NP | 0 | 0.15 | 0.05 | +0.1 | Dense |
| 1.4509 | T | NP | 0 | 0.03 | 0.1 | −0.07 | Not dense |
| 1.4509 | T | Ni-CGO | 0 | 0.05 | 0.1 | −0.05 | Not dense |
| JS-3 | T | Ni-CGO | 0 | 0.2 | 0.1 | +0.1 | Dense |

TABLE 1-continued

| Ferritic Stainless Steel Substrate | Oxide | Anode | Electrolyte | | | | Result |
|---|---|---|---|---|---|---|---|
| | | | $[M_A^{2+}]$ % | $[M_I^{2+}]$ % | $Y[M_I^{3+}]$ % | $[M_E^{2+}]$ % | |
| JS-3 | T | Ni-CGO | 0.1 | 0.1 | 0.1 | +0.1 | Dense |
| ZMG 232 | T | Ni-CGO | 0 | 0.2 | 0.12 | +0.08 | Dense |

NT indicates no pre-treatment to form oxide layer

Presence of Ni-CGO reduces concentration of Cr and Fe in electrolyte (these species probably trapped as $NiFe_2O_4$, $NiCr_2O_4$). Unless there is sufficient divalent cations such as $Mn^{2+}$ (eg JS-3) then the electrolyte is not dense.

The invention claimed is:

1. A method of preparing a ceria based electrolyte with a density greater than 97% of the theoretical achievable density, the method comprising:
   (i) providing a ceria based electrolyte; and
   (ii) sintering the electrolyte at a temperature up to 1200° C. by a sintering process to provide a sintered electrolyte, such that the concentration of divalent cations minus an adjusted concentration of trivalent cations in the sintered electrolyte is between 0.01 mole % and 0.1 mole %, wherein the concentration of trivalent cations is adjusted by multiplication by a number between 5 and 10.

2. A method as defined in claim 1, wherein the conditions of the sintering process are controlled to reduce at least some trivalent cations in the electrolyte into divalent cations.

3. A method as defined in claim 2, wherein the conditions of the sintering process are controlled to produce a suitable oxygen or water pressure to reduce a suitable amount of trivalent cations into divalent cations.

4. A method as defined in claim 1, wherein the electrolyte is provided on a substrate and wherein the substrate material is selected to produce the required concentration of divalent cations minus the adjusted concentration of trivalent cations in the electrolyte.

5. A method as defined in claim 4, wherein the electrolyte is provided on a substrate and the substrate material is selected to produce the required concentration of divalent cations minus the adjusted concentration of trivalent cations in the electrolyte and wherein an electrode is provided between the electrolyte and the substrate.

6. A method as defined in claim 1, wherein divalent cations are added to the electrolyte before or during the sintering process.

7. A method as defined in claim 1, wherein the concentration of divalent cations minus the adjusted concentration of trivalent cations in the sintered electrolyte is between 0.02 mole % and 0.09 mole % inclusive.

8. A method as defined in claim 7, wherein the concentration of divalent cations minus the adjusted concentration of trivalent cations in the sintered electrolyte is between 0.03 mole % and 0.08 mole % inclusive.

9. A method as defined in claim 1, wherein the electrolyte is sintered at a temperature up to 1100° C.

10. A method as defined in claim 9 wherein the electrolyte is sintered at a temperature up to 1050° C.

11. A method as defined in claim 10, wherein the electrolyte is sintered at a temperature up to 1000° C.

12. A ceria based electrolyte with a density greater than 97% of the theoretical achievable density and with a concentration of divalent cations minus an adjusted concentration of trivalent cations of between 0.01 mole % and 0.1 mole % inclusive, wherein the concentration of trivalent cations is adjusted by multiplication by a number between 5 and 10, and wherein the electrolyte is sintered.

13. An electrolyte as defined in claim 12, wherein the concentration of divalent cations minus an adjusted concentration of trivalent cations is between 0.02 mole % and 0.09 mole % inclusive.

14. An electrolyte as defined in claim 13, wherein the concentration of divalent cations minus an adjusted concentration of trivalent cations is between 0.03 mole % and 0.08 mole % inclusive.

15. An electrolyte as defined in claim 12, wherein the concentration of trivalent cations is adjusted by multiplication by a number between 5 and 10.

* * * * *